(12) United States Patent
Arnault et al.

(10) Patent No.: US 9,677,615 B2
(45) Date of Patent: Jun. 13, 2017

(54) BEARING RING, METHOD FOR MANUFACTURING SUCH A RING AND BEARING COMPRISING SUCH A RING

(71) Applicants: Benoit Arnault, Saint-Cyr-sur-Loire (FR); Stephane Gaultier, Sonzay (FR)

(72) Inventors: Benoit Arnault, Saint-Cyr-sur-Loire (FR); Stephane Gaultier, Sonzay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 63 days.

(21) Appl. No.: 14/751,205

(22) Filed: Jun. 26, 2015

(65) Prior Publication Data

US 2015/0377292 A1 Dec. 31, 2015

(30) Foreign Application Priority Data

Jun. 27, 2014 (FR) ..................... 14 56083

(51) Int. Cl.
| | | |
|---|---|---|
| F16C 33/58 | (2006.01) | |
| F16C 33/76 | (2006.01) | |
| F16C 33/78 | (2006.01) | |
| F16D 23/14 | (2006.01) | |
| F16C 43/04 | (2006.01) | |
| F16C 33/64 | (2006.01) | |

(52) U.S. Cl.
CPC ......... *F16C 33/586* (2013.01); *F16C 33/583* (2013.01); *F16C 33/783* (2013.01); *F16C 33/784* (2013.01); *F16C 33/7856* (2013.01); *F16C 43/045* (2013.01); *F16D 23/14* (2013.01); *F16C 33/64* (2013.01); *F16C 2361/43* (2013.01); *F16D 2300/08* (2013.01); *F16D 2300/12* (2013.01)

(58) Field of Classification Search
CPC ........ F16C 19/10; F16C 33/588; F16C 33/64; F16C 33/761; F16C 33/783; F16C 33/784; F16C 33/7853; F16C 33/7856
USPC ..................................... 29/898.066
See application file for complete search history.

(56) References Cited

U.S. PATENT DOCUMENTS 8,382,377 B2 * 2/2013 Yamamoto .......... B60B 27/0005
384/448
2011/0188797 A1 8/2011 Arnault

FOREIGN PATENT DOCUMENTS

| DE | EP 1457698 A2 * | 9/2004 | ............ F16C 19/163 |
|---|---|---|---|
| EP | 1249625 A1 | 10/2002 | |
| FR | 2984978 A1 | 6/2013 | |
| JP | 2010112532 A | 5/2010 | |

* cited by examiner

*Primary Examiner* — Phillip A Johnson
(74) *Attorney, Agent, or Firm* — Bryan Peckjian; SKF USA Inc. Patent Dept.

(57) ABSTRACT

A bearing ring comprising at least one jamming bead of a seal, each bead protruding relative to a radial surface of the ring, in an orthoradial direction relative to a central axis of the ring.

7 Claims, 4 Drawing Sheets

BEARING RING, METHOD FOR MANUFACTURING SUCH A RING AND BEARING COMPRISING SUCH A RING

CROSS REFERENCE TO RELATED APPLICATIONS

This is a Non-Provisional Patent Application, filed under the Paris Convention, claims the benefit of France Patent (FR) Application Number 1456083 filed on 27 Jun. 2014 (27.06.2014), which is incorporated herein by reference in its entirety.

TECHNICAL FIELD

The invention relates to a bearing ring, a method for manufacturing such a ring and a bearing comprising such a ring. Although the invention is preferably applicable to the outer ring of the antifriction bearing, it may also be implemented on the inner ring of the antifriction bearing.

BACKGROUND ART

The invention is in particular applicable in non-rolling throw-out bearings, but may also apply to rolling bearings.

In the field of mechanical bearings, in particular for throw-out bearings, it is known to use protective seals, or flanges, which are mounted inside the antifriction bearing to keep the grease near the rolling elements and protect the antifriction bearing from outside pollution. The problem that arises is then fastening of the seal on the inner or outer ring of the bearing. Bearing rings are manufactured by cutting and stamping a metal sheet. In FR-A-2,741,125, a peripheral groove is produced over 360° by coining. This makes it possible to fasten an annular flange that isolates a rolling chamber from the outside. Coining tamps the material in a direction perpendicular to the thickness of the metal sheet. This technique has high dimensional allowances, and the groove can be deformed during final stamping of the ring. Furthermore, tamping material in the metal sheet, which is necessary to produce the groove, causes thinning of the metal sheet at the groove, and therefore makes the ring more fragile in the fastening zone of the flange.

The same problems arise in the EP-A-1,249,625. In fact, as shown in FIGS. 1 and 2 of that publication, the ring on which the flange is fastened has a smaller section in the fastening zone of the flange, which suggests the presence of a peripheral groove.

The invention more particularly aims to resolve these drawbacks by proposing a bearing ring with which it is possible to fasten a seal more precisely, without making the structure of the ring more fragile, i.e., without making it thinner in the fastening zone of the seal.

To that end, the invention relates to a bearing ring comprises at least one jamming bead of the seal, each bead protruding relative to a radial surface of the ring, in an orthoradial direction relative to a central axis of the ring.

BRIEF SUMMARY OF THE PRESENT INVENTION

Owing to the invention, a protective seal for the antifriction bearing can be jammed by means of the peripheral bead(s). Each bead forms an overthickness relative to the rest of the ring, i.e., it does not create thinning of the ring in the fastening zone of the seal.

According to advantageous, but optional aspects of the invention, a bearing ring may comprise one or more of the following features, considered in any technically allowable combination:

The ring comprises several beads separated from one another.

The beads are positioned in diametrically opposite pairs.

Each bead extends over an identical angle relative to the central axis of the ring.

The sum of the angles over which the beads extend is smaller than 350°, preferably less than 320° and preferably equal to 300°.

The ring comprises a single bead, which extends over the entire perimeter of the radial surface of the ring.

The thickness of the ring is different on either side of the bead(s), and each bead comprises a jamming face of the seal, which is positioned on the thickest side of the ring.

The invention also relates to an antifriction bearing comprising a ring as previously described.

The invention lastly relates to a method for manufacturing a bearing ring, comprising a step a) for coining an annular metal sheet, defining a central axis, and comprising a step b) after step a), consisting of axially stamping the sheet coined in step a) to push back the material and form one or more peripheral beads protruding relative to a radial surface of the coined metal sheet.

According to one advantageous, but optional aspect of the method, it comprises a step c) after step a) and before step b), consisting of flattening an axial face of the ring, suitable for bearing against an anvil during the stamping of step b).

BRIEF DESCRIPTION OF THE DRAWINGS

The invention and other advantages thereof will appear more clearly in light of the following description of one embodiment of a bearing ring according to its principle, provided as an example and done in reference to the appended drawings, in which.

DETAILED DESCRIPTION OF THE PRESENT INVENTION

Figure 1:
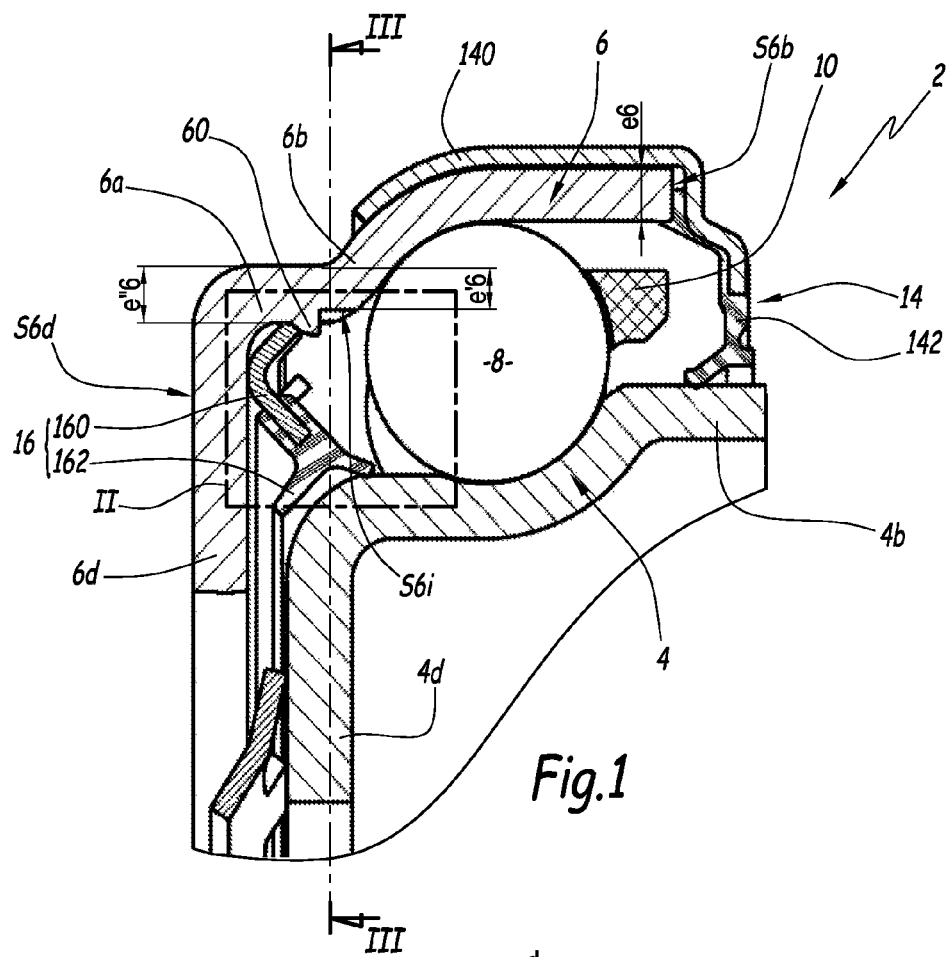
FIG. 1 is a partial sectional view of an antifriction bearing according to the invention comprising a ring also according to the invention.

FIG. 1 shows a mechanical antifriction bearing 2. This mechanical antifriction bearing 2 can be used as a throw-out bearing. It comprises an outer ring 6, which is centered on an axis X6, and an inner ring 4, which is positioned coaxially to the inside of the ring 6. In practice, the outer ring 6 rotates, while the inner ring 4 is stationary.

In the rest of the description, a rear direction designates an axial direction, i.e., parallel to the axis X6, that is turned toward an actuator, for example assuming the form of a throw-out fork, not shown, suitable for bearing on the right side of the antifriction bearing 2 in FIG. 1, which corresponds to the functional bearing side of the actuator. Conversely, a forward direction designates an axial direction, opposite the aforementioned direction, that is turned toward a throw-out diaphragm or a clutch pressure plate, not shown, this diaphragm in practice bearing on the ring 6 on the left side in FIG. 1, directly or indirectly if a wearing ring is placed between the two.

The rings 4 and 6 are made from metal and each comprises a front part 4*d* and 6*d*, respectively, which extends radially inward toward the central axis X6. The rings 4 and 6 also comprise a rear part 4*b* and 6*b*, respectively, which extends perpendicular to the front part 4*d* and 6*d*, respectively. The front part 6*d* of the ring 6 includes a front end face S6*d*, which is perpendicular to the axis X6. The rings 4 and 6 delimit a housing, or chamber, between them for receiving rolling elements 8. In the example, the rolling elements 8 are beads, but they may be rollers or needles. The rolling elements 8 are kept in their chamber by a cage 10.

The antifriction bearing 2 comprises rear and front annular seals, respectively referenced 14 and 16, which are positioned coaxially between the rings 4 and 6. These seals 14 and 16 make it possible to keep the grease near the rolling elements 8 during operation and limit the infiltration of outside particles inside the antifriction bearing 2. The seal 14 comprises an armature made from a metal or synthetic material, such as polyamide 140, which is crimped around the outer ring 6, and an elastomer part 142, which is secured to the armature 140 and ensures tightness in contact with the inner ring 4.

Likewise, the seal 16 comprises a metal armature 160 made from mild steel or spring steel and a flexible part made from elastomer 162 secured to the armature 160. The flexible part 162 ensures tightness in contact with the inner ring 4, while the rigid part, i.e., the armature 160, ensures tightening and maintenance in contact with the outer ring 6. More specifically, the armature 160 is positioned bearing against a rear face S'6*d* of the front part 6*d* of the ring 6 and the flexible part 162 bears against an outer radial surface S4*e* of the inner ring 4. In that case where the outer ring 6 is rotating, the seal 16 is fixedly connected to the rotating ring 6 and rubs against the stationary ring 4. The elastomer part 162 can be attached to the armature 160 using any suitable means, in particular by gluing, welding or overmolding. The elastomer part 162 comprises two lips 162*a* and 162*c*, the lip 162*a* bearing against the outer radial surface S4*e* of the inner ring 4. This part 162 also comprises a portion 162*b* in which the armature 160 penetrates.

Figure 2:
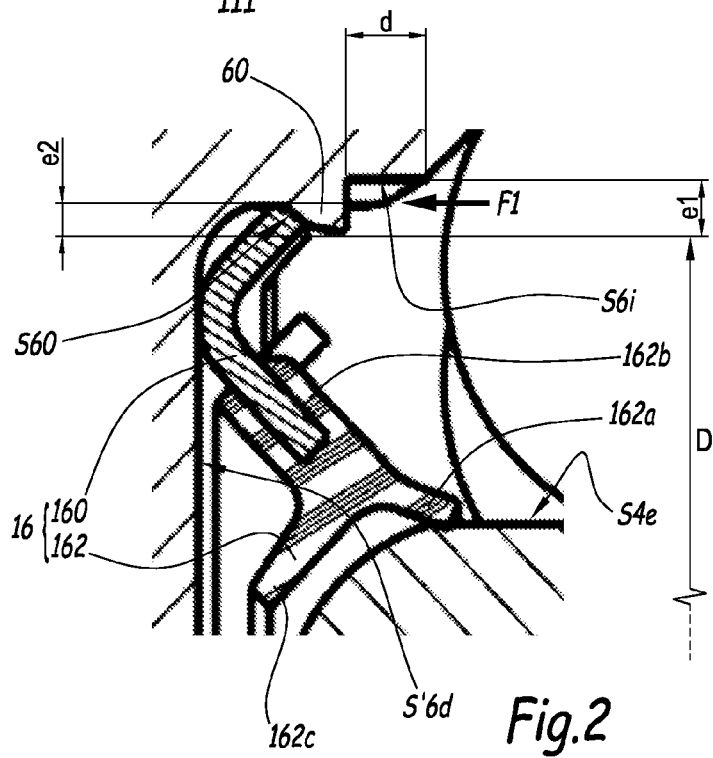
FIG. 2 is an enlarged view of box II in FIG. 1.
Figure 3:
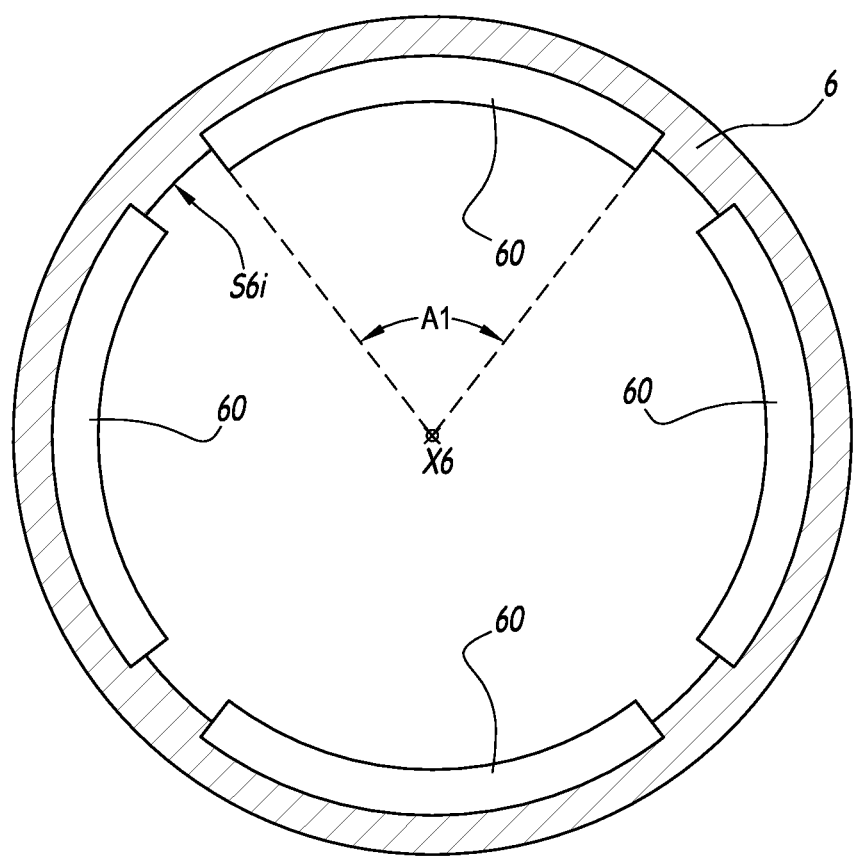
FIG. 3 is a sectional view in plane III-III of the ring of the antifriction bearing of FIGS. 1 and 2.

The seal 16 is jammed, or fastened, between the rings 4 and 6 using four beads 60 arranged on an inner radial surface S6*i* of the outer ring 6. These beads 60 are positioned in front of the rear part 6*b*, i.e., on the side of the fork, which corresponds to the side before engagement or to the clutch pressure plate side. In the embodiment of FIGS. 1 to 3, the beads 60 are separated from one another, there are four of them and they are positioned in diametrically opposite pairs relative to the axis X6. However, the number of beads may be different from four, and they are not necessarily positioned diametrically opposite. For example, in the case of an odd number of beads, the latter may be equally distributed around the axis X6. Each bead 60 extends in an orthoradial direction around the axis X6, i.e., it extends, in a plane perpendicular to the axis X6, like the plane of FIG. 3, over a circle portion.

As shown in FIG. 3, each bead 60 extends over an angular sector with an identical apical angle A1. In the example, the angle A1 is chosen to be equal to 75°, but it may be different. For example, in the case where only two beads 60 are provided, the angle A1 may be equal to 175°, preferably 150°. If three beads 60 are provided, this angle may be equal to 110°, preferably 100°. The angle A1 therefore varies based on the number of beads 40. The sum of the angles A1 over which the beads 60 extend is less than 350°, preferably less than 320° preferably equal to 330°.

Additionally, D designates the minimum inner diameter of the ring 6, i.e., the distance, measured passing through the center of the ring 6, between two diametrically opposite beads 69.

Each bead 60 includes a jamming surface S60 for the armature 160 of the seal 16. The armature 160 is jammed by the beads 60 against the front face S'6*d* of the rear part 6*d* of the ring 6. In this way, the seal 16 is immobilized inside the antifriction bearing 2.

The thickness of the ring 6 is different on either side of the beads 60. Reference e6 denotes the nominal thickness of the ring 6. Behind a bead 60, i.e., on the side of the rolling chamber, the thickness e'6 of the ring is less than or equal to the thickness e6. In front of a bead 60, i.e., between that bead and the front part 6*d*, the thickness e"6 of the ring is equal to, or slightly greater than, the thickness e6. This comes from the method for obtaining the beads 60 described below. The surface S60 is positioned on the thickest side of the ring 60, i.e., on the side of the part 6*d*. Thus, the ring 6 is not made thinner, i.e., more fragile, at the locking zone of the seal 16. There is therefore a lower risk of tamping of the material near the bead 60, which improves the long-term fastening of the seal 16.

The method for manufacturing the outer ring 6 is described below. A first step of this method consists of forging an annular metal sheet by coining so as to give the metal sheet a shape similar to that of the ring 6 of FIG. 1. This consists of stamping a flat precut annular metal sheet.

Next, the method comprises a subsequent step consisting of flattening an axial face S6*d* forming the front surface of the front part 6*d* of the axis 6 and the axial face S6*b* forming the rear surface of the rear part 6*b*. The surfaces can be flattened using any suitable means, in particular resurfacing, stamping or height calibration. In practice, a flatness defect will be allowed less than or equal to one tenth of a millimeter for the surfaces. The face S6*d* is flattened because it serves as a reference for a subsequent stamping operation, seeking to form the beads 60. This face S6*d* is in fact pressed against an anvil, not shown, during the final stamping of the metal sheet; that is why a flat surface is necessary to obtain good precision.

The aforementioned final stamping seeking to form the beads 60 is done axially, i.e., parallel to the axis X6 of the ring 6. A plate, not shown, provided with several identical axial punches may be used to form the beads 60. This plate is engaged axially, hot or cold, and toward the front in the material of the ring 6, in the direction of arrow F1 in FIG. 2. This requires less force than stamping in a direction perpendicular to the thickness of the metal sheet, which tends to tamp the material in the thickness of the metal sheet, as done in FR-A-2,741,125 during coining to form the groove.

The punches of the plate are stamped in the material of the ring 6 over a depth d, measured parallel to the axis X6, which is identical for each punch. The pushing of the punches into the material causes the pushback, or discharge, of the material toward the front by plastic deformation. The beads 60 are formed. These beads 60 are hardened relative to the rest of the ring 6 due to the work hardening created by the plastic deformation of the material.

The beads 60 form a radial overthickness e1 relative to the rear side 6*d* of the ring 6 and a radial overthickness e2 relative to the front side 6*d* of the ring 6. The overthickness e1 is greater than the overthickness e2. The volume of material moved is controlled by the pushing in distance d of the punches of the plate into the material of the ring 6. Thus, each bead 60 has the same dimensions, such that this operation is precise and easily repeatable. The overthickness values e1, e2, and therefore the inner diameter D, i.e., the distance between two diametrically opposite beads 60, are therefore obtained very precisely. The manufacture of the ring 6 can therefore be automated, i.e., industrialized. Furthermore, the final stamping seeking to form the beads 60 does not cause thinning of the ring at the front of the beads 60.

The formation of the beads 60 by stamping or any other method for pushing back material is carried out before any thermal treatment of the ring 6, such as dipping in an oil bath. If the ring is not thermally treated, the seal 16 can be mounted inside the ring 6 before the stamping operation seeking to form the beads 60.

FIGS. 4 to 7 show four other embodiments of an antifriction bearing 2. Each antifriction bearing of these different embodiments comprises an outer ring 6. These four embodiments differ from the first embodiment in terms of the assembly of the seal 16 on the ring 6. The elements described below that are identical to those of the first embodiment retain the same numerical references, while the different or additional elements bear other numerical references.

Figure 4:
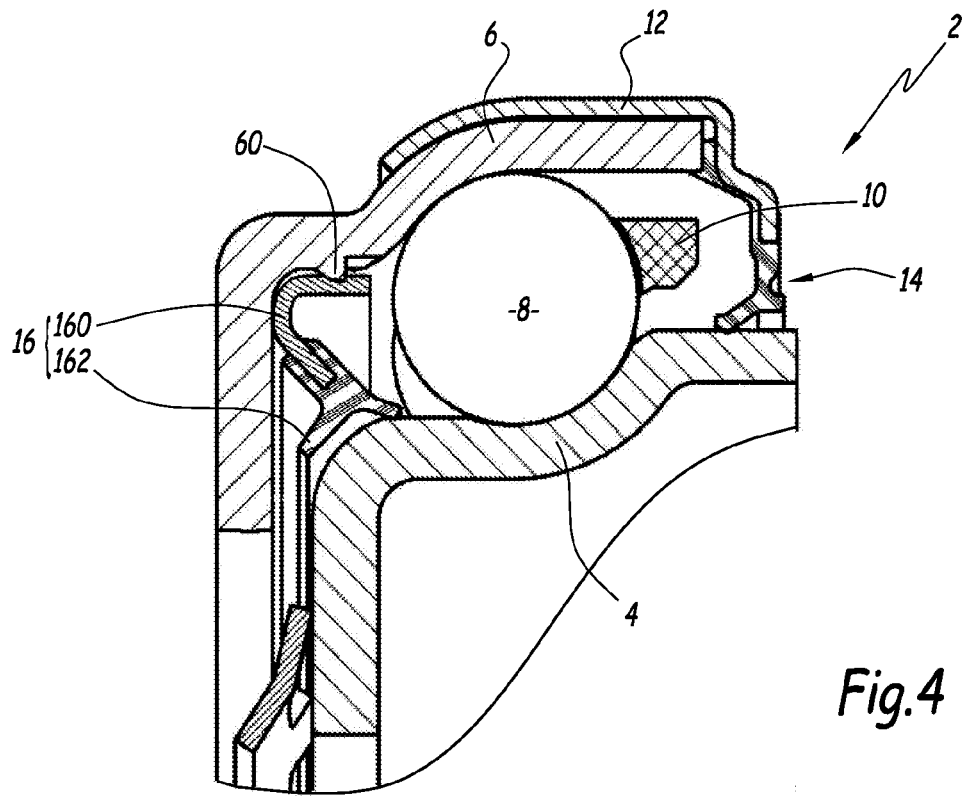
FIGS. 4, 5, 6, and 7 are sectional views similar to FIG. 1, of four other embodiments of an antifriction bearing according to the invention.

In the embodiment of FIG. 4, the seal 16 comprises an armature 160 made from mild steel in which the beads 60 made from hard steel superficially penetrate, which makes it possible to immobilize the seal 16 inside the antifriction bearing 2.

Figure 5:
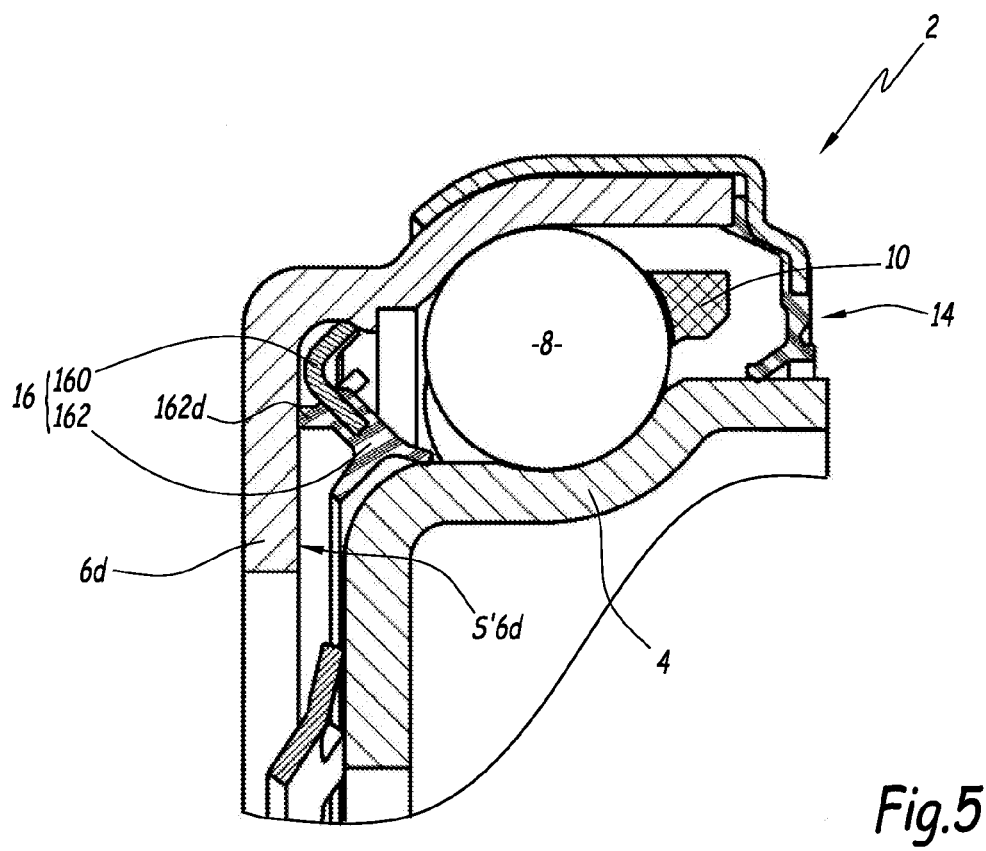

In the embodiment of FIG. 5, the elastomer part 162 of the seal 16 comprises a lip 162d in contact with the rear face S'6d of the front part 6d of the ring 6. The tightness of the seal 16 with the ring 6 is therefore no longer achieved by the armature 160, but by the elastomer part 162. Furthermore, this ring comprises a single bead 60 which extends, protruding relative to the inner radial surface S6, over 360° around the axis X6, i.e., over the entire periphery. In that case, the armature 160 of the seal 16 advantageously comprises tongues distributed on the periphery of that armature to become jammed in front of the beam 60.

Figure 6:
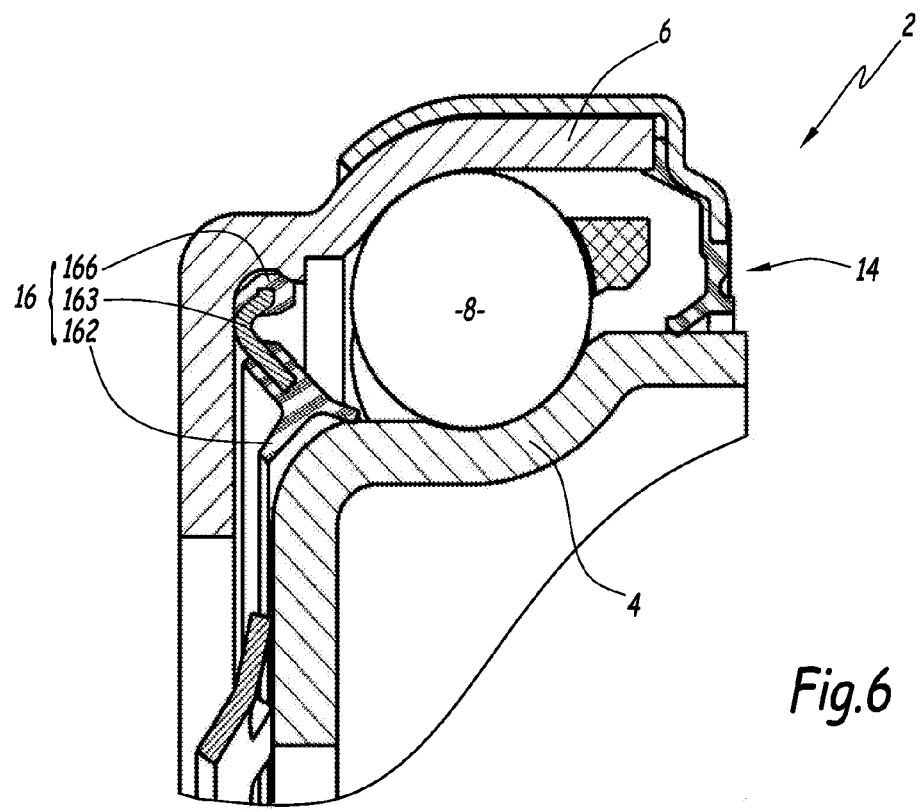

According to another embodiment shown in FIG. 6, the seal 16 further includes another elastomer part 166 that is fastened to one end of an armature 163 of the seal 16. The outer ring 6 of this embodiment also includes a single peripheral bead 60, extending over 360° around the axis X6. The elastomer part 166 is jammed by the single bead 60 and at the same time provides tightness against the ring 6 and anchoring of the seal 16 on the ring 6.

Figure 7:
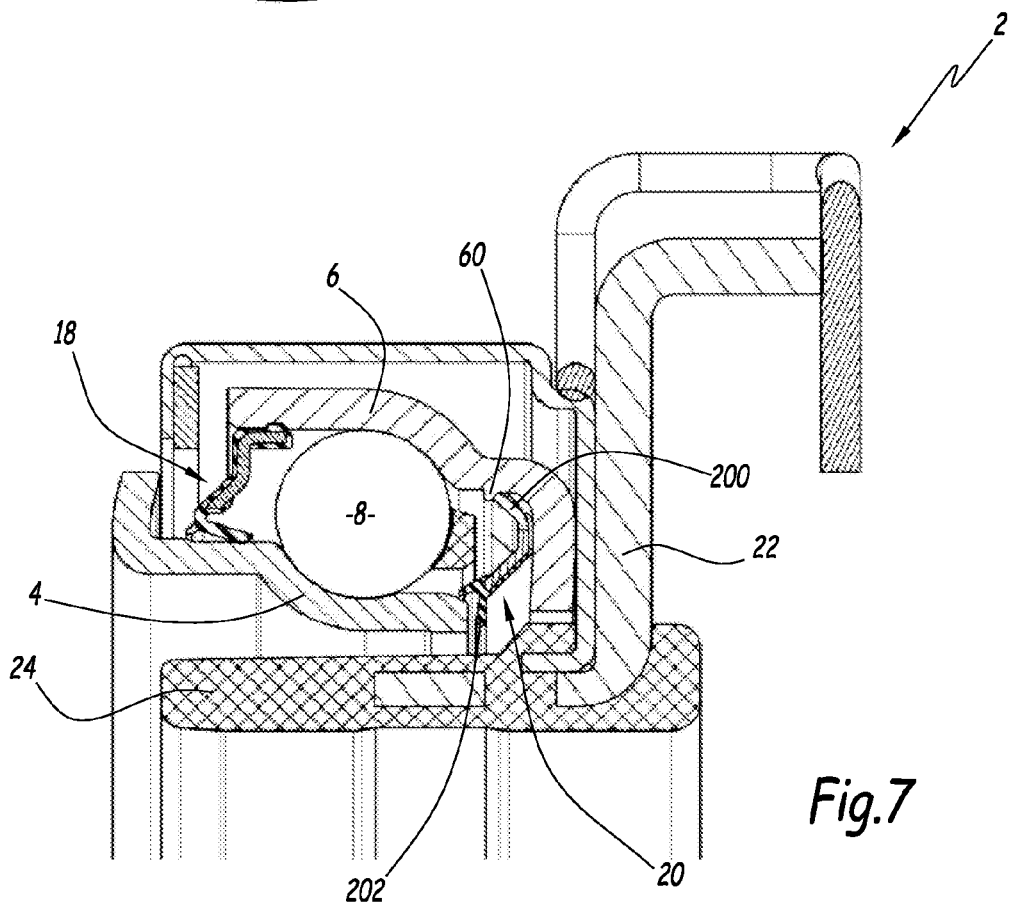

FIG. 7 shows a fifth embodiment of an antifriction bearing 2. This antifriction bearing 2 has the particularity of including a rotating inner ring 4 and a stationary outer ring 6. The antifriction bearing 2 also comprises a plastic sleeve 24, which is positioned coaxially inside the inner ring 4. Preferably, this sleeve 24 must not rub against the inner ring 4 under operating conditions of the antifriction bearing 2. The antifriction bearing 2 also comprises a rear plate 22 fastened to the sleeve 24.

In this embodiment, the beads 60 are arranged on the rear side of the outer ring 6, i.e., on the side of the fork. They form means for jamming a seal 20 comprising an armature 200 and an elastomer part 202 fastened to the armature 200. In this antifriction bearing 2, a seal 18 is also provided in front of the antifriction bearing, i.e., on the side of the diaphragm, to retain the grease and prevent particles from infiltrating inside the antifriction bearing.

As an alternative that is not shown and irrespective of the embodiment, the armature 160, 163 or 200 can be made from plastic.

According to another alternative that is not shown, the seal 16 is in a single piece and made entirely from a synthetic material.

According to another alternative that is not shown, the seal 16 is a contactless seal, i.e., it does not bear against either of the rings. This seal is for example a labyrinth-type seal.

According to another alternative that is not shown, the bead(s) have a triangular section, i.e., the locking face of the seal, similar to the surface S60, is strictly frustoconical, or has a frustoconical portion and converges toward the rear in the direction of the axis X6, inasmuch as punches with circular sections are used.

According to an alternative that is not shown, the bead(s) 60 are arranged on an outer surface of the inner ring 4. In the figures, the invention is shown during its implementation in non-rolling throw-out bearings. It is applicable to rolling throw-out bearings, and more generally, any type of antifriction bearing. In the case of a non-rolling bearing, the rotating ring is rotatable only around its axis, whereas in the case of a rolling bearing, the rotating ring is rotatable around its axis and around any axis radial to its central axis.

The features and alternatives of the embodiments considered above may be combined to create new embodiments of the invention.

The invention claimed is:

1. A bearing ring, comprising:
   a seal,
   at least one jamming bead of the seal, the at least one bead protruding relative to a radial surface of the ring, in an orthoradial direction relative to a central axis of the ring, and
   several beads separated from one another.

2. The bearing ring according to claim 1, wherein the beads are positioned in diametrically opposite pairs.

3. The bearing ring according to claim 1, wherein each bead extends over an identical angle relative to the central axis of the ring.

4. The bearing ring according to claim 1, wherein the sum of the angles over which the beads extend is smaller than 350°.

5. The bearing ring according to claim 1, comprising a single bead, wherein the single bead extends over the entire perimeter of the radial surface of the ring.

6. The ring according to claim 1, wherein a thickness of the ring is different on either side of the at least one bead, and the at least one bead comprises a jamming face of the seal, which is positioned on the thickest side of the ring.

7. The bearing ring according to claim 1, wherein the bearing ring is adapted for use as an antifriction bearing.

* * * * *